US009377713B2

(12) United States Patent
Faucher et al.

(10) Patent No.: US 9,377,713 B2
(45) Date of Patent: Jun. 28, 2016

(54) CUSTOM COLOR TONER PRODUCTION SYSTEMS AND METHODS

(75) Inventors: Santiago Faucher, Oakville (CA); Gerhard Pawelka, Mississauga (CA); Majid Kasmaei Kamel, North York (CA); Michael S. Hawkins, Cambridge (CA); Suxia Yang, Mississauga (CA); Richard P. N. Veregin, Mississauga (CA); Joseph Barbisan, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 1035 days.

(21) Appl. No.: 13/436,623

(22) Filed: Mar. 30, 2012

(65) Prior Publication Data

US 2013/0255190 A1 Oct. 3, 2013

(51) Int. Cl.
*G06F 3/12* (2006.01)
*G03G 15/08* (2006.01)

(52) U.S. Cl.
CPC .................................. *G03G 15/0867* (2013.01)

(58) Field of Classification Search
None
See application file for complete search history.

(56) References Cited

U.S. PATENT DOCUMENTS 5,268,849 A * 12/1993 Howlett et al. ............... 700/226
5,722,008 A 2/1998 Laing
7,188,993 B1 * 3/2007 Howe et al. ................... 366/111
2004/0012645 A1 * 1/2004 Kinalski et al. ................... 347/7
2004/0091286 A1 * 5/2004 Lange et al. .................. 399/223
2005/0160077 A1 * 7/2005 Howes .............................. 707/2
2007/0183815 A1 * 8/2007 Himes ........................... 399/262
2008/0044755 A1 * 2/2008 Marcello et al. ........... 430/110.2
2008/0112730 A1 5/2008 Borton et al.
2010/0294113 A1 * 11/2010 McPherson ...................... 86/1.1
2012/0144783 A1 * 6/2012 Nakamura et al. .............. 53/473

FOREIGN PATENT DOCUMENTS

DE 20 2008 001 701 U1 5/2008
EP 0 833 219 A1 4/1998
EP 1 315 048 A2 5/2003
JP 2001-283013 A1 10/2001

OTHER PUBLICATIONS

Search Report in related United Kingdom patent application GB1305072.9 (Search date: Sep. 6, 2013).

* cited by examiner

*Primary Examiner* — John Wallace
(74) *Attorney, Agent, or Firm* — Ronald E. Prass, Jr.; Prass LLP

(57) ABSTRACT

A custom color toner production system includes a toner delivery system, a cartridge sealing system, a mixing system, and a packaging system. The toner delivery system includes selectively engageable fluid delivery lines for delivering toner of particular color to a cartridge as need for producing a custom color toner in response to an electronically submitted user request. Cartridge containing the unmixed delivered toner may be sealed by a sealing system, and blended using a resonant mixer to produce a custom color toner. The cartridge containing the mixed custom color toner may be packaged using a packaging system.

15 Claims, 3 Drawing Sheets

CUSTOM COLOR TONER PRODUCTION SYSTEMS AND METHODS

FIELD OF DISCLOSURE

The disclosure relates to systems and methods for custom color toner production. In particular, the disclosure relates to systems and methods for producing a custom color toner in a toner cartridge.

BACKGROUND

Related art systems and methods for toner production are designed to produce cyan, magenta, yellow, and black color toners, and are unsuitable for custom color toner production due to the high costs associated with preparation, production, and clean-up of Henschel blenders and associated equipment. Customers often request custom color toner for running in print engines. Producers of toner typically accommodate such requests by using primary color toners that are blended together in large Henschel blenders to produce a custom color blend. The blend is packaged into cartridges for shipping; and due to cost considerations, is typically produced and shipped in large quantities.

SUMMARY

Systems and methods for custom color toner production are disclosed. Systems and methods enable cost-effective true custom color toner production.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to.

In an embodiment, systems may include a custom color toner cartridge production system comprising a toner cartridge filling apparatus configured to feed at least one color toner to a toner cartridge, the color being determined based upon an electronically submitted request, the custom color toner cartridge production system being configured for connection to a local area or wide area communications network. In an embodiment, systems may include the toner cartridge filling apparatus further comprising a plurality of color feeders, including a first color feeder being configured to feed a first color toner to the toner cartridge, and a second color feeder being configured to feed a second color toner to the toner cartridge.

In an embodiment, systems may include a mixing system, the mixing system being configured to blend toner contained by the toner cartridge, the toner being mixed while being contained by the cartridge. In an embodiment, systems may include a resonant mixer, the resonant mixer being configured to vibrate the toner cartridge for blending toner contained by the cartridge. Systems may include the acoustic mixer being configured to vibrate the toner cartridge at a resonant frequency of at least the toner cartridge, the toner contained by the cartridge, and the clamping assembly for the cartridge. In an embodiment, systems may include a packaging system for packaging the cartridge, such as a system configured to insert the cartridge in a box, container, plastic wrapping or other suitable packaging.

In an embodiment, custom color toner cartridge production systems may include a toner cartridge filling apparatus, the cartridge filling apparatus being configured to feed at least a first color toner and a second color toner to a toner cartridge for mixing the toner in the cartridge. Systems may include the toner cartridge filling apparatus further comprising a plurality of color feeders, including a first color feeder being configured to feed the first color toner to the toner cartridge, and a second color feeder being configured to feed the second color toner to the toner cartridge. A color feeder may include a mechanism or structure suitable for delivering toner such as a fluid delivery line connected to a toner reservoir.

In an embodiment, systems may include a mixing system, the mixing system being configured to mix the first color toner and the second color toner to produce a blend, the first color toner and the second color toner being contained by the toner cartridge. In an embodiment, systems may include the mixing system further comprising a resonant mixer, the resonant mixer being configured to vibrate the toner cartridge whereby the first color toner and the second color toner are blended together, the blend being a color that is different than a color of the first color toner and the second color toner. Systems may include the resonant mixer being configured to vibrate the toner cartridge at a resonant frequency of at least the toner cartridge and toner contained by the cartridge.

In an embodiment, systems may include a packaging system for packaging the cartridge having the first color toner and the second color toner. Systems may include the toner cartridge filling apparatus being configured to feed the toner cartridge wherein the at least first color and second color are determined based on a user request received from a local area communications network or a wide area communications network for one or more cartridges containing a custom color toner.

In an embodiment, customer toner color production methods may include feeding at least a first color toner and a second color toner to a toner cartridge for blending in the toner cartridge. Methods may include closing the cartridge containing the at least first color toner and second color toner; and transferring the cartridge from a toner feeding apparatus, the toner feeding apparatus being configured for the feeding the at least first color toner and second color toner, to a resonant mixing apparatus. Methods may include the at least first color toner and the at least second color toner being selected from among a group of colors of toner, the feeding apparatus comprising a plurality of feed lines, each feed line being configured to deliver a color toner. Methods may include the feed lines used for the feeding the at least first and second color toners being determined based on a customer request, the customer request being submitted through a communications network, the feeding apparatus being connected to the communications network.

In an embodiment, methods may include vibrating the cartridge and toner contained by the cartridge at a resonant frequency of the cartridge and the cartridge and the cartridge clamping apparatus. Methods may include transferring the cartridge from the mixing apparatus to a conveyor belt for packaging. In an embodiment, methods may include enclosing the cartridge, the cartridge containing toner mixed in the cartridge, in packaging.

Exemplary embodiments are described herein. It is envisioned, however, that any system that incorporates features of apparatus and systems described herein are encompassed by the scope and spirit of the exemplary embodiments.

DETAILED DESCRIPTION

Figure 1A:
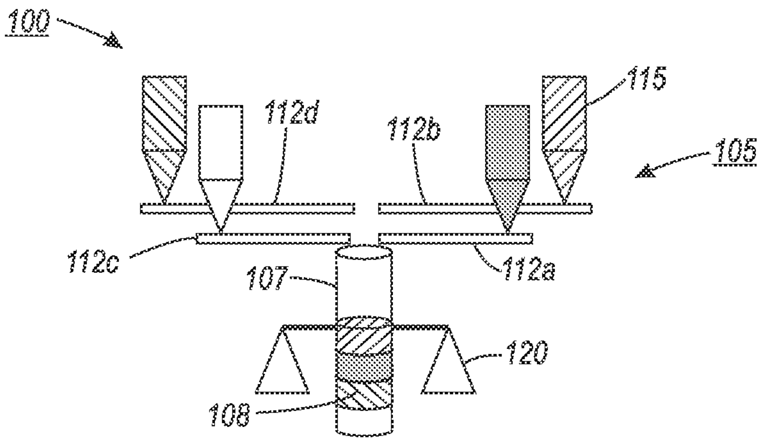
FIGS. 1A-1E shows a diagrammatic side view of custom color toner production system at steps of a custom color production process in accordance with an exemplary embodiment.

Exemplary embodiments are intended to cover all alternatives, modifications, and equivalents as may be included within the spirit and scope of the apparatus and systems as described herein.

Reference is made to the drawings to accommodate understanding of systems and methods for custom color toner production. In the drawings, like reference numerals are used throughout to designate similar or identical elements. The drawings depict various embodiments and data related to embodiments of illustrative systems and methods for custom color toner production.

Systems and methods accommodate cost-effective production of custom color toners. This allows, for example, toner producers to accommodate orders for custom color toner of various sizes, large or small. A customer may place an order through an internet connected user interface by way of a computing device such as a smart phone or personal computer, for example. The order may be received by a custom color toner production system, translated or interpreted, and automatically filled, even if the order is for only a single cartridge of custom color toner. To fill the order, the custom color production system may cause an empty toner cartridge to be transported to a load cell to be tarred. Toner of particular colors may then be delivered to the cartridge. The colors may be selected based on a determination of the colors required to fulfill the custom color order. The determination may be made by an associated controller and/or software.

The cartridge may be closed and loaded into a resonant mixer. The resonant mixer may be set to a frequency that corresponds to a resonant frequency of the toner, cartridge, and cartridge holder, and may be caused to agitate the toner cartridge at the resonant frequency for less than about 0.5 minutes, for example. The mixer may be configured to agitate the toner or shake the cartridge for blending the toner and producing a desired color toner. The cartridge may be discharged or removed form the mixer, and packaged for distribution. Alternatively, the cartridge its packaging can be loaded onto the mixer and shaken.

FIG. 1A shows a diagrammatical view of a custom color production system in accordance with an embodiment. FIG. 1A shows a custom color production system at a step of filling a toner cartridge. The custom color production system 100 includes a toner delivery system 105 for delivering marking material such as toner. For example, the toner delivery system 105 may be a toner cartridge filling apparatus configured to deliver toner 108 of one or more colors to a toner cartridge 107.

The toner delivery system 105 may include feed lines or delivery such as fluid delivery lines 112*a*-112*d* for delivering toner of particular colors to the toner cartridge 107. Each of the delivery lines 112*a*-112*d* may be connected to respective toner reservoirs. Each of the toner reservoirs may contain toner of a particular color, such as a primary color, and connected delivery lines may be configured to deliver toner of a particular color, and may be configured for selective actuation for delivering toner from one or more specific toner reservoirs 115.

For example, fluid delivery line 112*a* may be connected to a toner reservoir for containing yellow toner. Fluid delivery line 112*b* may be connected to a toner reservoir for containing magenta toner. Fluid delivery line 112*c* may be connected to a toner reservoir for containing cyan toner. Fluid delivery line 112*d* may be connected to a toner reservoir for containing black toner. Custom color production systems may include one or a plurality of fluid delivery lines, and/or a toner delivery system configured to deliver any number of toner colors to a toner cartridge as needed for producing a custom color toner. The toner delivery system 105 may include a load cell 120 for weighing a toner cartridge 107.

Figure 1B:
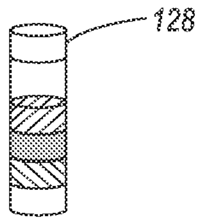

Custom color toner production systems may include a cartridge closing system for closing a toner cartridge or marking material container. A conveyor system (not shown) may be implemented for transporting a toner cartridge 107 from system to system, for example, from a toner delivery system 105 to a cartridge closing system. After a toner cartridge 107 has been filled with delivered toner 108, the toner cartridge 107 may be transported to a closing system for sealing the cartridge with a cap 128, for example, as shown in FIG. 1B.

Figure 1C:
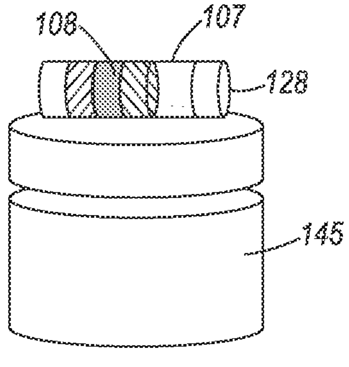
Figure 1D:
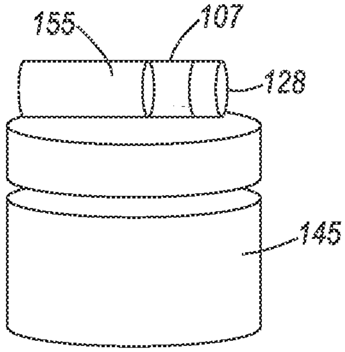

The sealed cartridge 107 having the cap 128 may be transported to and/or loaded in a mixing system as shown in FIG. 1C. For example, the cartridge containing the delivered toner 108 may be loaded in a resonant mixer 145. The cartridge may be loaded in the resonant mixer 145 by way of a cartridge holder. The resonant mixer 145 may be configured to agitate the delivered toner 108 to mix the toner in the toner cartridge 107. The resonant mixer may be configured, for example, to vibrate the cartridge at a resonant frequency of the sealed cartridge 107, the delivered toner 108, and the cartridge holder to mix the delivered toner 108 to produced blended toner 155 as shown FIG. 1D.

Figure 1E:
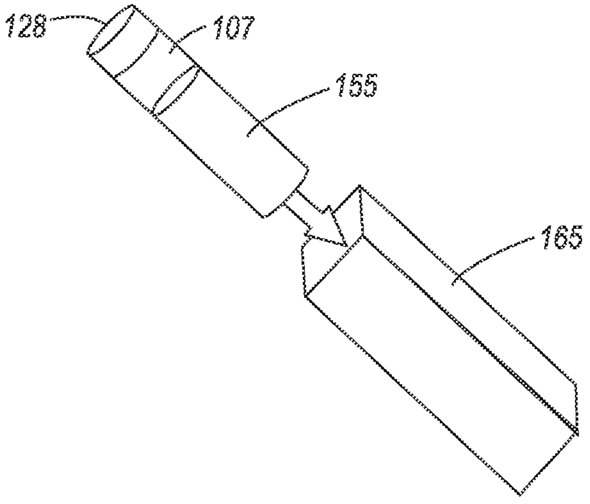

A toner cartridge 107 having cap 128 and containing blended toner 155 may be transported to a cartridge packaging system for packaging as shown in FIG. 1E. For example, a toner cartridge 107 may be inserted into a box, wrapped in plastic, or otherwise packaged for protection and/or distribution.

The custom color toner production system may be configured to automatically produce a custom color in response to a user or customer request. For example, a custom color toner production system 100 may be connected to a local or wide area telecommunications network for electronic communication. Systems of the custom color toner production system 100 may be operably connected to the LAN and/or WAN for receiving purchase orders for custom color toner, for example. In response to a purchase order, a custom color toner production system 100 may be caused to determine what toner colors are required to make a custom toner color. The system 100 may be caused to selectively actuate fluid delivery lines 112*a*-112*d,* and/or other fluid delivery lines as needed to delivery particular color toners determined by the system or determined by an operator to yield the requested custom color when mixed. The system 100 may be configured to seal the cartridge containing the delivered toner 108, mix the delivered toner mixture 108 to produce a mixed toner 155 of the custom color indicated in the purchase order, for example, and package the cartridge for delivery in accordance with the purchase order.

Figure 2:
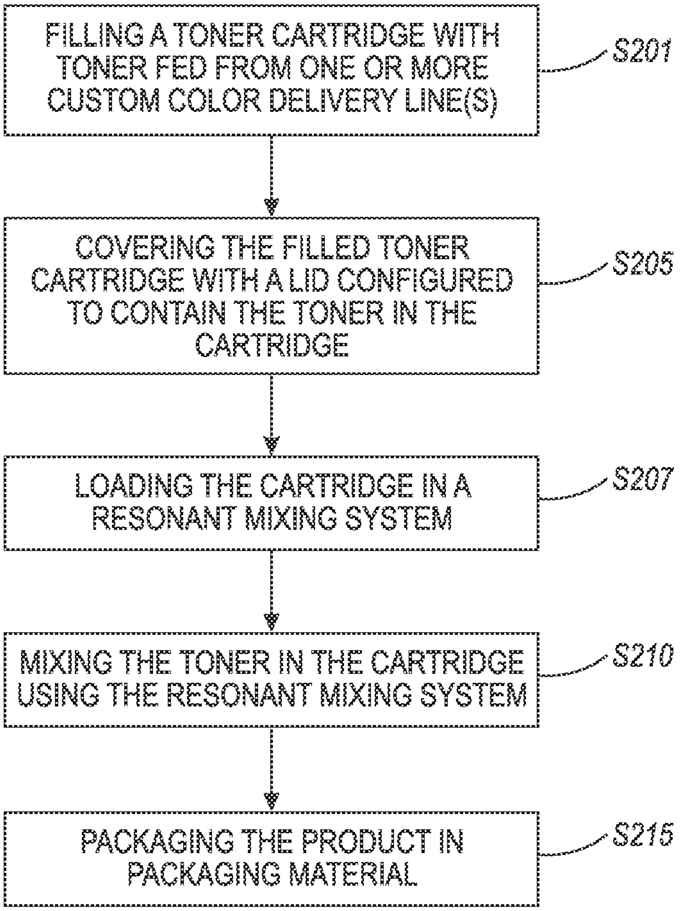
FIG. 2 shows methods for custom color toner production in accordance with an exemplary embodiment.

FIG. 2 shows methods of custom color toner production in accordance with an exemplary embodiment. FIG. 2 shows methods including filling a toner cartridge at S201, or other suitable marking material container, with marking material such as toner. The cartridge may or may not be filled to capacity with the toner. The toner may be delivered at S201 to the cartridge from one or more selectively engageable fluid delivery lines. Each of the fluid delivery lines may be connected to respective reservoirs that contain a particular color marking material, e.g., toner. Particular delivery line(s) associated with respective ink reservoir(s) of a particular color may be selectively engaged and/or actuated as required to produce a custom blended toner of a custom color. Methods may include covering the filled toner cartridge with a lid configured to contain the toner within the cartridge at S205. The cartridge may be placed at a load cell before toner delivery. At the load cell, the cartridge may be tarred. The cartridge may be transported from a toner delivery apparatus comprising the one or more fluid delivery lines to a closing system for closing the cartridge. The cartridge may be transported using, for example, a transport system comprising a conveyor belt configured to transport a cartridge to a plurality of processing systems, which may include a fluid delivery system, a cartridge closing system, a resonant mixing system, and a packaging system.

Methods may include loading the cartridge in a resonant mixing system at S207. The resonant mixing system may include a resonant mixer configured to agitate a toner cartridge or vibrate toner contained by a cartridge for mixing the contained toner. The cartridge may be loaded in a resonant mixing system by way of a cartridge holder. A cartridge holder may be configured to support a toner cartridge for processing and/or transport of the cartridge and/or its contents.

Methods may include mixing toner delivered to a toner cartridge using a resonant mixing system. As shown in FIG. 2, methods may include mixing toner in a toner cartridge using a resonant mixing system at S210. The resonant mixing system may include a resonant mixer such as, for example, a Resodyn LabRAM 500 g model. Methods may include agitating or vibrating the cartridge and/or its contents at, for example, a resonant frequency of the cartridge, a cartridge holder, and toner contained by the cartridge. The mixing may cause the toner to blend, producing a custom color based on the color toners delivered to the toner cartridge.

Methods may include packaging a cartridge containing a custom color toner in packaging material at S215. For example, a cartridge containing mixed toner and/or toner of a custom color may be processed at S215 to insert the cartridge in packaging material such as a box, or wrap the cartridge in plastic, for example.

An example of a custom color toner produced using systems and methods in accordance with embodiments is provided below:

Example I

Sorrento Violet Toner.

42 g of magenta toner was added to 18 g of cyan toner in a 100 ml propylene bottle. The material was placed in a resonant mixer. A suitable resonant mixing system may include a Resodyn LabRAM 500 g model mixer. The mixer was set to frequency of 61 Hz, which is the resonant frequency of the bottle, its contents, and a mechanical holder for supporting the bottle. The mixer was energized. While energized, the resonant mixer imparted 30 to 100 G's of acceleration to the vessel and its contents. After 30 seconds of vibrating at this frequency, the mixer was de-energized, and the bottle was removed from the mixer. The resulting mixture was analyzed on a spectrograph and referenced to a production sample that was produced using conventional large scale blending equipment. A dE between the experimental mixture and the reference mixture 0.62. It is preferred that a dE be less than 2.5, which is about the point at which the average human eye can no longer detect color difference. Accordingly, systems and methods accommodate cost-efficient custom color toner production that is capable of blending toner in 30 seconds or less to produce custom colors.

Systems and methods accommodate custom color toner production for small or large scale production. Indeed, systems and methods may accommodate production of a single toner cartridge containing a custom color toner. Systems and methods may include mixing toner to produce a custom color toner mixture wherein the toner is mixed and blended, and the custom color toner produced in the toner cartridge. It has been found that systems and methods accommodate effective use of typical toner cartridges. For example:

Example II 60 g of Magenta Toner and 30 g of cyan were delivered to a replenisher cartridge. The cartridge was loaded onto an acoustic resonant mixer. A suitable resonant mixer may be, for example, a Resodyn LabRAM 500 g model. The mixer was set to a frequency of 61 Hz, which is the resonant frequency of the cartridge, its contents, and a mechanical holder for holding the cartridge. After 5 minutes of vibration at this frequency, the mixer was de-energized, and the cartridge was removed. The cartridge was analyzed to determine that no damage was sustained by the cartridge during mixing.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A custom color toner cartridge production system, comprising:

a toner cartridge filling apparatus configured to feed a combination of color toners to a custom color toner cartridge, the color resulting from the combination of color toners being a custom color determined based upon an electronically submitted request, the custom color toner cartridge production system being configured for connection to a wide area communications network; and a mixing system, the mixing system being configured to mix toner contained by the custom color toner cartridge, the toner being mixed while being contained by the custom color toner cartridge, to produce a toner blend at the custom color, the mixing system being configured to vibrate the custom color toner cartridge at a frequency based on a resonant frequency of the custom color toner cartridge and the combination of toners contained by the custom color toner cartridge, the mixing system including an acoustic mixer configured to vibrate the custom color toner cartridge at a resonant frequency of the custom color toner cartridge, the combination of toners contained by the custom color toner cartridge, and a mechanical holder for supporting the custom color toner cartridge for 0.5 minutes or less.

2. The system of claim 1, the toner cartridge filling apparatus further comprising:

a plurality of color feeders, including a first color feeder being configured to feed a first color toner to the custom color toner cartridge, and a second color feeder being configured to feed a second color toner to the custom color toner cartridge housing the first color toner fed from the first color feeder.

3. The system of claim 1, the custom color toner cartridge being a sealed portable cartridge configured for use in a separate remote print engine.

4. The system of claim 3, comprising:

a packaging system for packaging the cartridge.

5. A custom color toner cartridge production system, comprising:

a toner cartridge filling apparatus, the cartridge filling apparatus being configured to feed a combination of a first color toner and a second color toner to a portable custom color toner cartridge for mixing the combination of toners in the custom color cartridge into a toner blend; and a mixing system, the mixing system being configured to mix the first color toner and the second color toner, the first color toner and the second color toner being contained by the custom color toner cartridge, to produce the toner blend, the mixing system further including a resonant mixer, the resonant mixer being configured to vibrate the custom color toner cartridge to blend the first color toner and the second color toner to produce the toner blend having a color that is different than the color of the first color toner and the color of the second color toner, the resonant mixer being configured to vibrate the custom color toner cartridge at a frequency based on a resonant frequency of the custom color toner cartridge and the combination of first and second color toners contained by the custom color toner cartridge the resonant mixer being an acoustic mixer configured to vibrate the custom color toner cartridge at a resonant frequency of the custom color toner cartridge, the combination of first and second color toners contained by the cartridge, and a mechanical holder for supporting the custom color toner cartridge for 0.5 minutes or less.

6. The system of claim 5, the toner cartridge filling apparatus further comprising:

a plurality of color feeders, including a first color feeder being configured to feed the first color toner to the custom color toner cartridge, and a second color feeder being configured to feed the second color toner to the custom color toner cartridge.

7. The system of claim 5, the custom color toner cartridge being a sealed portable cartridge configured for use in a separate remote print engine.

8. The system of claim 5, further comprising:

a packaging system for packaging the custom color toner cartridge having the first color toner and the second color toner; and a cartridge sealing system for closing the custom color toner cartridge after filling the custom color toner cartridge with the combination of toners, and before vibrating the custom color toner cartridge to produce a toner blend.

9. The system of claim 5, further comprising the toner cartridge filling apparatus being configured to feed the custom color toner cartridge whereby the at least first color and second color are determined based on a user request received by from a wide area communications network for one or more custom color toner cartridges containing a custom color toner.

10. A customer toner color production method, comprising:

feeding, with a toner cartridge filling apparatus, a combination of at least a first color toner and a second color toner to a portable custom color toner cartridge for mixing the combination of toners in the custom color toner cartridge; and mixing, with an acoustic mixer, the customer color toner cartridge and toner contained by the custom color toner cartridge at a resonant frequency of the custom color toner cartridge, the combination of toners contained by the custom color toner cartridge to blend the toner, and a mechanical holder for supporting the custom color toner cartridge for 0.5 minutes or less to blend the toner.

11. The method of claim 10, further comprising:

closing the custom color toner cartridge containing the at least first color toner and second color toner to seal the custom color toner cartridge for mixing; and transferring the custom color toner cartridge from a toner feeding apparatus, the toner feeding apparatus being configured for the feeding of the combination of the at least first color toner and second color toner, to a resonant mixing apparatus, the resonant mixing apparatus being configured for blending the toner in the custom color toner cartridge.

12. The method of claim 11, further comprising:

transferring the custom color toner cartridge from the mixing apparatus to a conveyor belt for packaging.

13. The method of claim 12, further comprising:

enclosing the custom color toner cartridge, the custom color toner cartridge containing toner mixed in the custom color toner cartridge, in packaging.

14. The method of claim 10, wherein the at least first color toner and the at least second color toner are selected from among a group of colors of toner, the feeding apparatus comprising a plurality of feed lines, each feed line being configured to deliver a color toner.

15. The method of claim 14, wherein the feed lines used for feeding the combination of at least first and second color toners are determined based on a customer request, the customer request being submitted through a communications network, the feeding apparatus being connected to the communications network.

* * * * *